United States Patent
Louboutin

(10) Patent No.: US 11,927,973 B2
(45) Date of Patent: Mar. 12, 2024

(54) DEVICE FOR CONTROLLING THE FLOW OF A FLUID

(71) Applicant: VERNET, Ollainville (FR)

(72) Inventor: Laurie Cécile Marie Louboutin, Arpajon (FR)

(73) Assignee: VERNET, Ollainville (FR)

( * ) Notice: Subject to any disclaimer, the term of this patent is extended or adjusted under 35 U.S.C. 154(b) by 161 days.

(21) Appl. No.: 17/787,657

(22) PCT Filed: Dec. 17, 2020

(86) PCT No.: PCT/EP2020/086823
§ 371 (c)(1),
(2) Date: Jun. 21, 2022

(87) PCT Pub. No.: WO2021/123021
PCT Pub. Date: Jun. 24, 2021

(65) Prior Publication Data
US 2022/0413524 A1  Dec. 29, 2022

(30) Foreign Application Priority Data

Dec. 18, 2019  (FR) ....................... 1914742

(51) Int. Cl.
  G05D 23/02  (2006.01)
  F16K 11/044  (2006.01)
  F16K 31/00  (2006.01)

(52) U.S. Cl.
  CPC .......... *G05D 23/022* (2013.01); *F16K 11/044* (2013.01); *F16K 31/002* (2013.01)

(58) Field of Classification Search
  CPC .... G05D 23/02; G05D 23/021; G05D 23/022; F16K 31/002
  See application file for complete search history.

(56) References Cited

U.S. PATENT DOCUMENTS 5,690,276 A * 11/1997 Thiel .................. F01P 7/16
                                                236/100
2018/0156346 A1* 6/2018 Lamb ................. F16K 31/002

FOREIGN PATENT DOCUMENTS

DE  10 2015 016 115 A1  6/2017
EP          1376290 A1  1/2004
FR          2774740 A1  8/1999

OTHER PUBLICATIONS

French Search Report for Application No. FR 1914742 dated Jun. 16, 2020.

(Continued)

*Primary Examiner* — Jonathan Bradford
(74) *Attorney, Agent, or Firm* — MARSHALL, GERSTEIN & BORUN LLP

(57) ABSTRACT

A fluid control device includes a slide valve movable in a chamber along an axis between a closed position, in which the slide valve is pressed axially against a fixed seat, and an open position, in which the slide valve is axially separated from the seat and a thermomechanical actuator, which is able to drive the slide valve depending on the temperature of the fluid in the chamber and which includes both a thermostatic element, including a fixed piston, and a body forming a heat-sensitive part of the thermomechanical actuator, arranged inside the chamber The piston being mounted with the ability to move along the axis on the body so that the piston deploys against the body when the thermally expandable material expands, and a return spring, interposed axially between the casing and the body so as to retract the piston away from the body when the thermally expandable material contracts.

20 Claims, 9 Drawing Sheets

(56) References Cited

OTHER PUBLICATIONS

International Search Report for Application No. PCT/EP2020/086823 dated Jun. 27, 2021.

* cited by examiner

DEVICE FOR CONTROLLING THE FLOW OF A FLUID

The present invention relates to a device for controlling the flow of a fluid.

The invention relates to the field of valves and is more specifically concerned with valves for liquids, controlling the flow of this liquid as a function of the temperature of the latter. The invention has a particular, but not exclusive, application in the sanitary field, relating to the control of the flow of hot water in a sanitary facility.

In this field, FR 2 774 740 discloses a thermostatic cartridge incorporating an anti-scald safety device by means of an overtravel system. In order to control the flow of a hot water stream and the flow of a cold water stream respectively in inverse proportions, this cartridge includes in particular a thermostatic element, including a thermosensitive body, and a slide valve which is fixedly connected to the thermosensitive body. Thanks to this thermostatic cartridge, the hot water flow is opened/closed at a given temperature, that is without the closing being operated at a temperature higher than that at which the opening is operated.

Moreover, for reasons of comfort and water saving, it is known to try to ensure that the hot water circuit of a sanitary facility always contains hot water, that is, water, the temperature of which remains higher than a predetermined temperature of, for example, 32° C., close to a draw-off point such as a tap or a shower. In this way, when the user activates the opening of the draw-off point, hot water, such as water the temperature of which is higher than the aforementioned predetermined temperature, comes out almost immediately from the draw-off point, without the user having to wait for sufficiently hot water to flow out from a water heating appliance such as a water heater, storage tank or boiler, usually at a distance, to the draw-off point, and thus without having to waste the insufficiently hot water that was contained in the water circuit between the water heater and the draw-off point at the time the latter was opened. To this end, flow control devices are installed close to the draw-off point, fed by the water coming from the water heater, and are designed so that, if the temperature of the water fed to these control devices is sufficiently high, they direct this water towards the draw-off point, whereas, if the temperature of the water fed to these control devices is lower than the aforementioned predetermined temperature, they return this water to the water heater, via the cold water circuit of the sanitary facility. Of course, the hot water circuit is overpressurized relative to the cold water circuit. These control devices are designed so that the recirculation, towards the water heater, of the water supplying the control device is initiated as soon as the temperature of this water falls below the aforementioned predetermined temperature, and then so that this recirculation is maintained as long as the temperature of the water supplied to the control device has not risen again above a second predetermined temperature, higher than the first aforementioned predetermined temperature. In this way, the start of a recirculation is only controlled when the hot water at the control device has cooled by at least the difference between the aforementioned first and second predetermined temperatures. This allows the water in the hot water circuit to be recirculated less frequently than if the opening of the control device were controlled by the same water temperature as its closing.

The corresponding control devices, available on the market, comprise both electric valves, controlled by an ad hoc electronic component which is informed by a temperature sensor, sensitized by the hot water, or bimetallic shutters which are in contact with the hot water, and which deform under the effect of variations in temperature of the hot water. These control devices are complex and, therefore, relatively expensive. They are also difficult, if not impossible, for the user to adjust.

The object of the present invention is to provide a new flow control device which, while providing at least the same performance as known control devices, is less expensive and more convenient.

To this end, the subject matter of the invention is a device for flow controlling a fluid, including: a casing, which defines an axis and which delimits a chamber in which the fluid flows between an inlet and an outlet of the casing, a slide valve which is mobile in the chamber along the axis between: a closed position, in which the slide valve is pressed axially against a fixed seat (16) of the casing so as to prevent the fluid, admitted into the chamber through the inlet, from leaving the chamber through the outlet, and an open position, in which the slide valve is axially separated from the seat so as to let the fluid, admitted into the chamber through the inlet, leave the chamber through the outlet, a thermomechanical actuator, which is designed to drive the slide valve between the closed and open positions depending on a temperature of the fluid in the chamber and which includes: a thermostatic element, which includes both a piston, which is connected to the casing in such a way that, in an operating configuration of the device, the piston occupies a fixed position according to the axis relative to the casing, and a body, which contains a thermally expandable material and which, together with this thermally expandable material, forms a heat-sensitive part of the thermomechanical actuator arranged in the chamber, the piston being mounted so as to be movable in the direction of the axis on the body in such a way that the piston is deployed relative to the body when the thermally expandable material expands, and a return spring, which is axially interposed between the casing and the body so as to retract the piston relative to the body upon contraction of the thermally expandable material, and hysteresis-inducing arrangements which define a first temperature, as well as a second temperature which is lower than the first temperature, the hysteresis-inducing arrangements being designed so that: the thermomechanical actuator drives the slide valve from the open position to the closed position when the temperature of the fluid in the chamber rises above the first temperature, and the thermomechanical actuator drives the slide valve from the closed position to the open position when the temperature of the fluid in the chamber falls below the second temperature, and wherein the hysteresis-inducing arrangements are integrated with the slide valve and the thermomechanical actuator and comprise mechanical connecting elements that are adapted to: connect the slide valve and the body to each other for displacement according to the axis when the temperature of the fluid in the chamber is higher than the first temperature and when the temperature of the fluid in the chamber is lower than the second temperature, and provide an axial clearance between the slide valve and the body, which decouples the slide valve and the body according to the axis when the temperature of the fluid in the chamber is between the first temperature and the second temperature as defined in claim 1.

One of the ideas behind the invention is to use, to control the flow of the fluid, a slide valve driven by a thermomechanical actuator, which is directly using the heat of this fluid to move the slide valve, which avoids having to supply the device of the invention with electricity or other energy. Moreover, in order to ensure that the closing and opening of the device are controlled at different fluid temperatures, namely at a first temperature and a second temperature lower than the first temperature, the invention provides for hysteresis, by integrating ad hoc hysteresis-inducing arrangements into this device. In practice, these hysteresis-inducing arrangements can present multiple embodiments, as detailed below. In particular, it will be noted that certain embodiments are structurally close to thermostatic cartridges, such as the one disclosed in FR 2 774 740 mentioned above and which are normally designed to deliver a mixed fluid by mixing a hot fluid and a cold fluid, but which, in the invention, incorporates the aforementioned hysteresis-inducing arrangements and which are used in a roundabout manner, as explained hereinafter. Furthermore, as also explained in more detail hereinafter, these hysteresis-inducing arrangements can advantageously be adjustable so that the user can modify the value of the aforementioned first and second temperatures. In any case, the hysteresis-inducing arrangements are advantageously provided so that the difference between the first and second temperatures is at least 4° C. The control device according to the invention is thus efficient and reliable, while being inexpensive to manufacture and simple to use.

According to A additional advantageous features of the device according to the invention: A control member able to adjust value of the first and second temperatures by changing the position of at least a part of the thermomechanical actuator along the axis relative to the casing. The casing, the slide valve, the thermomechanical actuator, and the control member together form a cartridge that is able to be integrally fitted into a fluid system connection housing. The control member comprises: an end cap, against which the piston is pressed axially under action of the return spring, a nut, on which the end cap is mounted in a sliding manner along the axis, and which is mounted on the casing both translationally movable along the axis and rotationally fixed about the axis, an overtravel spring, which is interposed axially between the end cap and the nut so as both to connect the end cap and the nut axially in a rigid manner as long as the movement of the slide valve by the body relative to the casing is free and to deform under effect of deployment of the piston relative to the body when movement of the slide valve by the body with respect to the casing is prevented, and a screw, which protrudes at least partially from the casing and which is screwed about the axis in the nut, while being locked in translation according to the axis relative to the casing. The mechanical connecting elements include a first stop and a second stop, which are arranged on a first component of the slide valve and the body, and are axially distant from each other, and the second component of the slide valve and the body, is: in axial abutment against the first stop when the temperature of the fluid in the chamber is higher than the first temperature, in axial abutment against the second stop when the temperature of the fluid in the chamber is lower than the second temperature, and freely movable according to the axis, relative to said first component, between the first and second stops when the temperature of the fluid in the chamber is between the first temperature and the second temperature. The hysteresis-inducing arrangements are also integrated with the casing and further comprise mechanical friction elements, which are able to generate, by friction between the slide valve and the casing, a resistance that: opposes the thermomechanical actuator from driving the slide valve according to the axis relative to the casing when the temperature of the fluid in the chamber is between the first temperature and the second temperature, is overcome by the force applied to the slide valve by the thermomechanical actuator to drive the slide valve towards the closed position when the temperature of the fluid in the chamber rises above the first temperature, and is overcome by the force applied to the slide valve by the thermomechanical actuator to drive the slide valve to the open position when the temperature of the fluid in the chamber falls below the second temperature. The mechanical friction elements comprise a rigid relief, which is provided on a first component from the casing or the slide valve and which interferes axially with a flexible portion of the second component of the casing and the slide valve to generate said resistance. Said flexible portion is a seal. Said flexible portion is a seal of the slide valve.

The invention will be better understood from the following description, given only by way of example and made with reference to the drawings in which.

Figure 1:
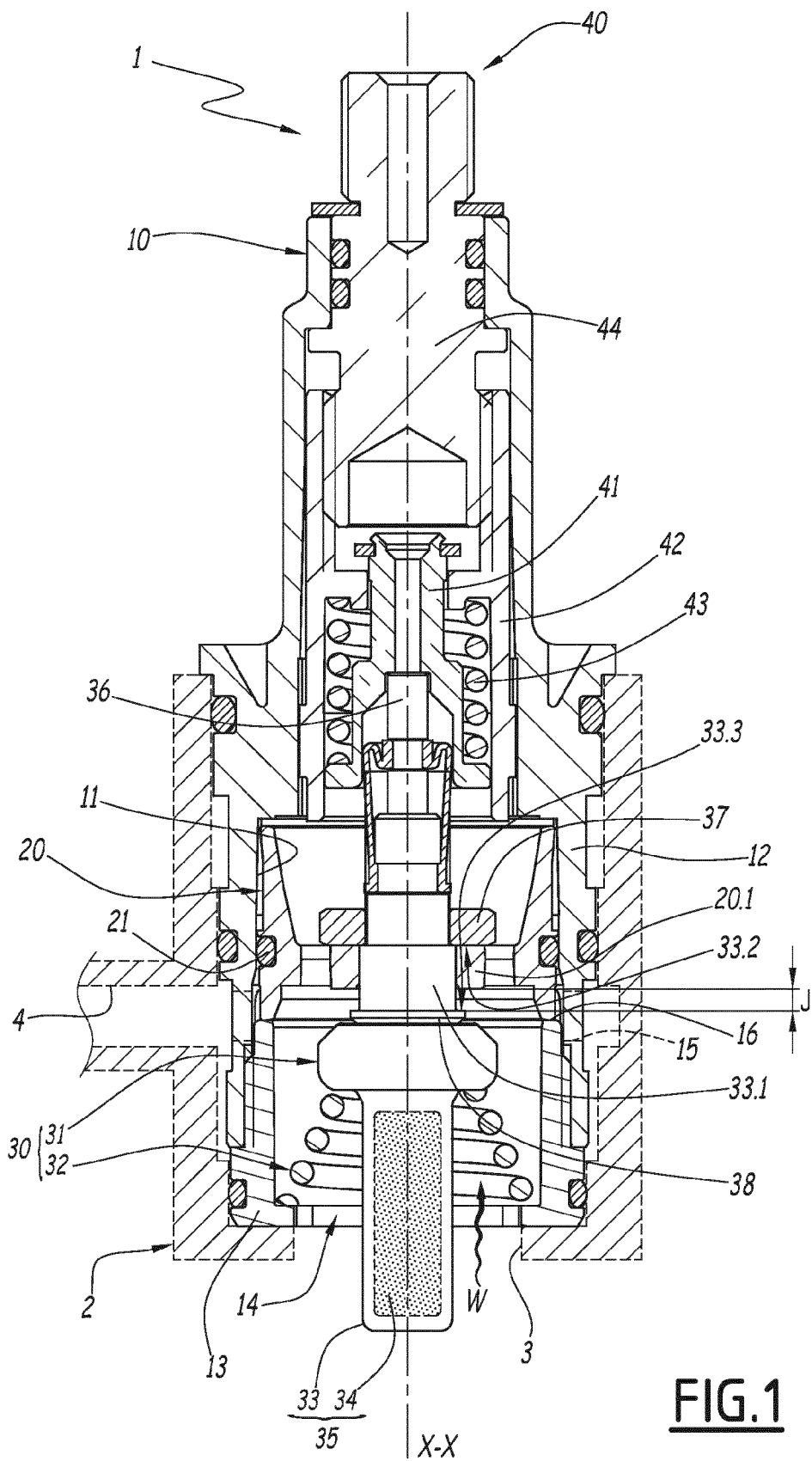
FIG. 1 is a longitudinal section of a first embodiment of a control device.

In FIGS. 1 to 6 is shown a device 1 for controlling the flow of a fluid, in particular a liquid. The device 1 is intended, for example, to equip a sanitary installation, in particular by being installed in a water supply circuit.

As can be seen from FIGS. 1 to 6, the device 1 includes, as its main external component, a hollow casing 10. This casing 10 presents an overall tubular shape, extending lengthwise along and around an axis X-X. The internal volume of the casing 10 forms a chamber 11, which, in the example considered in the figures is centered on the X-X axis and extends along this axis, between opposite axial ends of the casing 10.

For convenience, the remainder of the description is oriented relative to the casing 10, in that the terms "inside" and "outside" are understood relative to the chamber 11. Similarly, the terms "top" and "upper" refer to a direction according to the X-X axis toward one of the longitudinal ends of the casing 10, namely the end directed toward the top portion of FIGS. 1-6, while the terms "bottom" and "lower" refer to a direction in the opposite direction.

Thus, between the upper and lower ends of the casing 10, the chamber 11 is delimited by the inner face of a tubular wall 12 of the casing 10, this tubular wall 12, here being centered on the axis X-X.

In the example considered here, the casing 10 includes, at its lower end, a sleeve 13, which is fixedly attached, for example by screwing, to the rest of the casing 10, extending it downwards. This sleeve 13 thus constitutes the lower end portion of the tubular wall 12. Moreover, in the example considered in the figures, the rest of the casing 10 is of one piece, it being understood that, in a variant not shown, this casing may be made up of several portions fixedly attached to one another, and this by any appropriate means, in the same way as the sleeve 13 is fixedly attached to the rest of the casing 10. Of course, as a variant not shown, the sleeve 13 may be provided in one piece with all or part of the rest of the casing 10.

In the assembled state of the device 1, as shown in the figures, the casing 10 is intended to be mounted inside a housing 2 which is shown partially and schematically only in FIG. 1. This housing 2 is designed to connect the device 1 to a fluid network, for example a water circuit in which water W flows. As shown schematically in FIG. 1, the housing 2 presents an inlet passage 3 and an outlet passage 4, which are connected to the aforementioned water circuit and through which water W flows, through the housing 2, between the aforementioned water circuit and the device 1. When the device 1 is mounted inside the housing 2, this device 1 allows the circulation of the water W to be controlled, via the chamber 11 of the casing 10, from the inlet passage 3 to the outlet passage 4, by supplying the inlet passage 3 with water W coming from the aforementioned water circuit. In practice, the casing 10 is mounted inside the housing 2 in a watertight manner, with seals interposed between the outer face of the casing 10 and the inside of the housing 2.

In order to allow the water W to flow from the inlet passage 3 to the outlet passage 4 via the chamber 11 of the casing 10, this casing delimits both an inlet 14, which opens outside the chamber 11 in the inlet passage 3, and an outlet 15, which opens outside the chamber 11 in the outlet passage 4. In the embodiment considered in the figures, the inlet 14 is provided at the lower end of the casing 10 and the water W flows through it parallel to the axis X-X. In particular, the inlet 14 forms a cylindrical opening, substantially centered on the X-X axis. The outlet 15 is, itself, located in the current portion of the casing 10 and the water W flows there radially to the axis X-X. The outlet 15 is for example constituted by one or more peripheral openings, running around the X-X axis.

Figure 3:
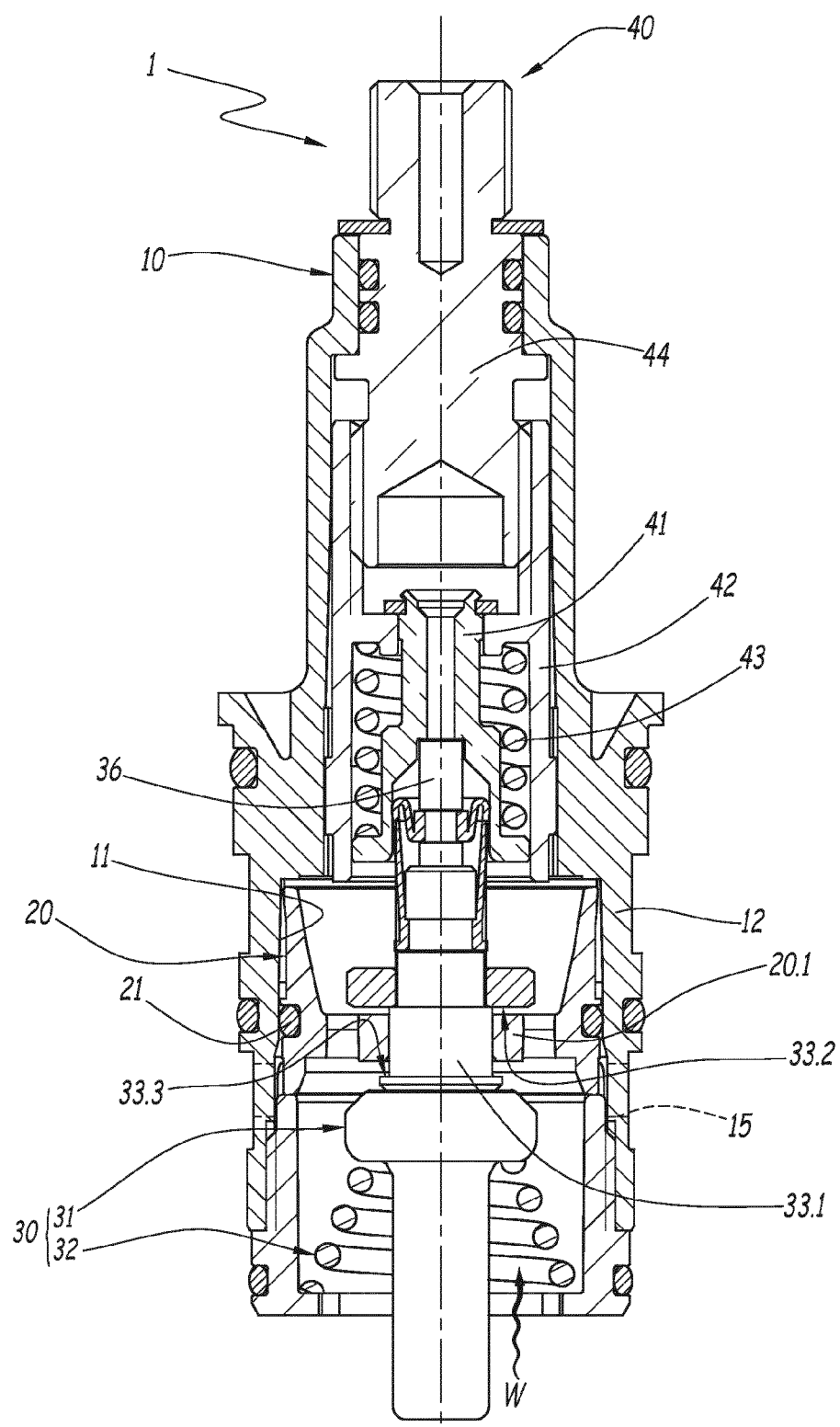
Figure 4:
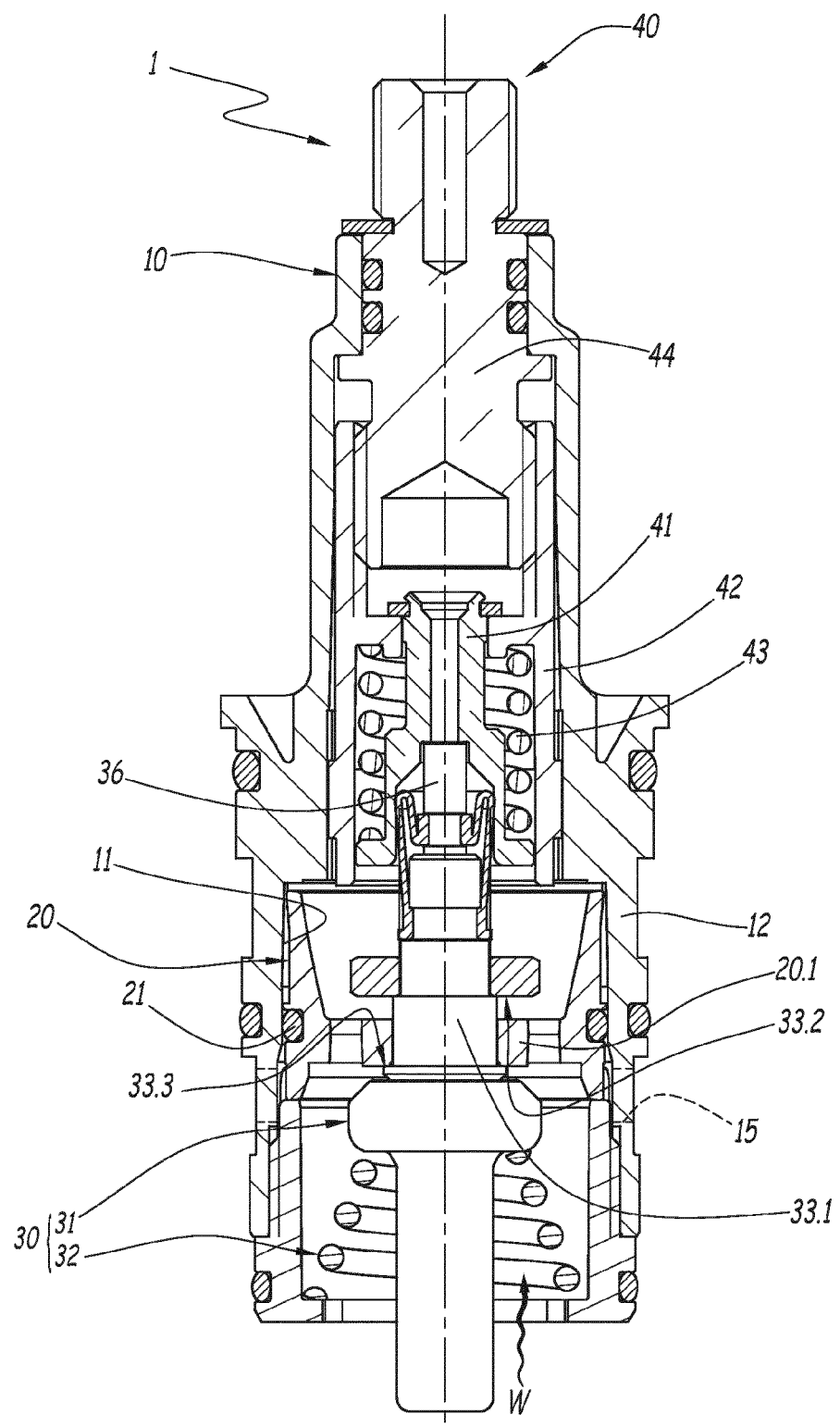
Figure 5:
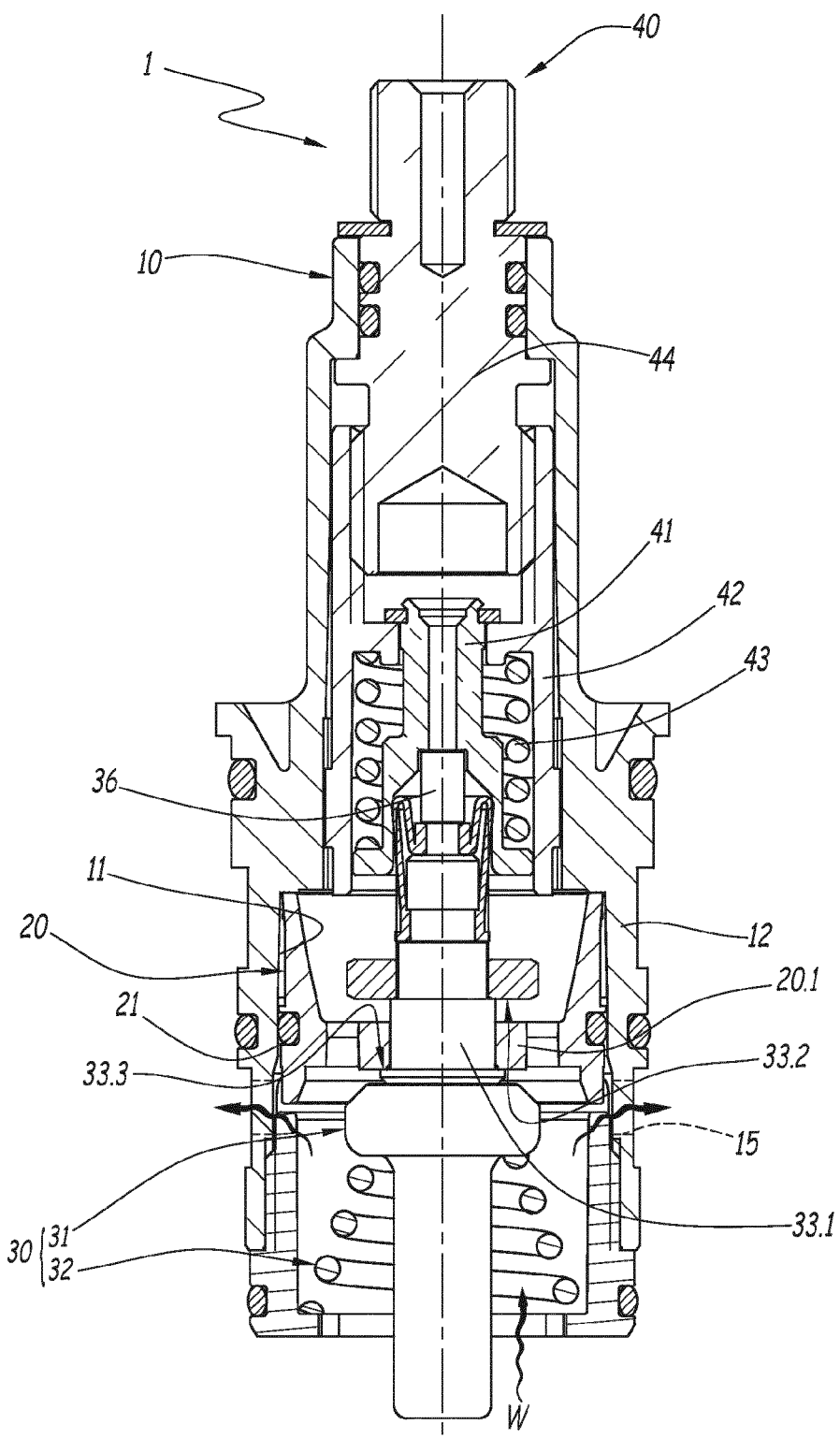
Figure 6:
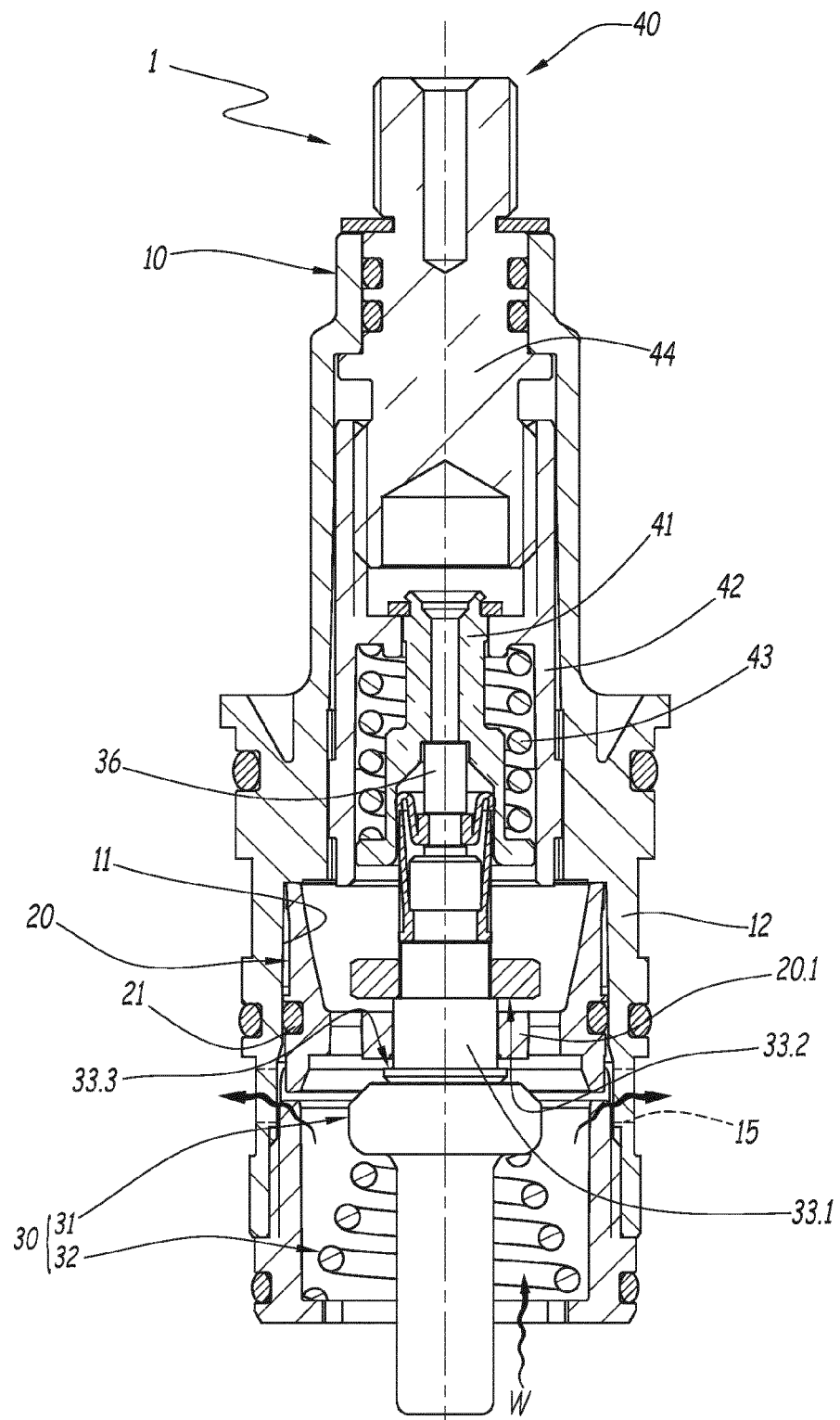

In order to act on the flow of water W, in the chamber 11, from the inlet 14 to the outlet 15, the device 1 includes a slide valve 20 which is arranged inside the chamber 11 and which is movable therein along the axis X-X between two opposite extreme positions, namely a closed position, which is illustrated by FIGS. 1 to 4, and an open position, which is illustrated by FIGS. 5 and 6. When the slide valve 20 is in the closed position, the slide valve 20 closes the outlet 15, being pressed axially against a seat 16 with which the casing 10 is fixedly provided. When the slide valve 20 is in the open position, the slide valve opens the outlet 15, being moved axially away from the seat 16. The water W admitted into the chamber 11 through the inlet 14 is thus prevented by the slide valve 20 from leaving the chamber through the outlet 15 when this slide valve is in the closed position, whereas when the slide valve 20 is in the open position, the slide valve lets this water W, admitted into the chamber 11, leave the latter through the outlet 15. In practice, the shape of the seat 16, as well as that of the portion of the slide valve 20, intended to cooperate by axial support with this seat 16 for the purpose of closing/opening the outlet 15, are not limiting of the invention.

In order to drive the slide valve 20 between the closed and open positions, the device 1 includes a thermomechanical actuator 30 which, here, includes a thermostatic element 31 and a return spring 32.

The thermostatic element 31 includes a body 33 which, as shown schematically only in FIG. 1, contains a thermally expandable material 34. The body 33 and the thermally expandable material 34 form a heat sensitive part 35 of the thermostatic element 31 which, in the assembled state of the device 1, is arranged, at least partially, inside the chamber 11 in order to be sensitized by the heat of the water W admitted into the chamber 11.

The thermostatic element 31 also includes a piston 36 which is movably mounted on the body 33 along the central longitudinal axis of the piston. In the assembled state of the device 1, the piston 36 extends lengthwise centered on the X-X axis, being movable relative to the body 33 along the X-X axis. Furthermore, the piston 36 is connected to the casing 10 in such a way that, in use, that is, in a given operating configuration of the device 1, the piston 36 occupies a fixed position relative to the casing 10. In the embodiment considered in the figures, the piston 36 is thus connected to the casing 10 by a control member 40, which will be detailed later. In any case, in the aforementioned operating configuration, an expansion of the thermally expandable material leads to the deployment of the piston 36 relative to the body 33 and, thereby, to the downward movement of the body 33 in translation according to the X-X axis.

The return spring 32 is interposed axially between the casing 10 and the body 33 in such a way that, in the aforementioned operating configuration, a contraction of the thermally expandable material 34 causes the piston 36 to retract relative to the body 33 under the effect of the return spring 32, causing the body 33 to move upwardly in translation according to the X-X axis relative to the casing 10. In practice, the form of construction and the arrangement of the return spring 32 are not limiting of the invention.

As is clearly visible in FIG. 1, the control member 40, the interest and function of which will become apparent later, includes an end cap 41 against which the piston 36 is pressed axially upward, under the action of the return spring 32. The end cap 41 thus controls the position of the piston 36 along the X-X axis relative to the casing 10.

The control member 40 also includes a nut 42, on which the end cap 41 is slidably mounted along the X-X axis, and an overtravel spring 43, which is axially interposed between the end cap 41 and the nut 42. In the embodiment considered in the figures, the overtravel spring 43 is pressed axially downwards against the end cap 41, in particular against a flange of the latter, while the overtravel spring 43 is pressed axially upwards against the nut 42, in particular a transverse wall of the latter. The overtravel spring 43 is sufficiently stiff that, in the assembled state of the device 1, the overtravel spring axially connects the end cap 41 and the nut 42 rigidly to each other as long as the axial displacement of the slide valve 20 by the thermomechanical actuator 30 relative to the casing 10 is free. In other words, as long as the slide valve 20 can be moved downward without axially interfering with the casing 10, in particular without axially abutting against the seat 16, the end cap 41 and the nut 42 form, under the action of the overtravel spring 43, a rigid subassembly, in particular with respect to the axial position of this subassembly relative to the casing 10. On the other hand, as soon as the downward movement of the slide valve 20 is prevented, typically by axial interference with the casing 10 at the level of the seat 16, the overtravel spring 43 is intended to deform under the effect of the upward movement of the piston 36 relative to the body 33: by deformation of the overtravel spring 43, the end cap 41 then slides upward, without changing the axial position of the nut 42. This prevents damage to the device 1 when the thermostatic element 31 heats up significantly, leading to the piston 36 moving over a distance greater than the travel of the slide valve 20 between its closed and open positions.

As shown in FIG. 1, the nut 42 is mounted on the casing 10 in such a way as to be both movable in translation along the axis X-X relative to the casing 10 and connected in rotation about the axis X-X to the casing 10. For this purpose, the face of the nut 42, facing the inner face of the tubular wall 12 of the casing 10, is provided, for example, with elongated ribs, which extend parallel to the axis X-X, and which are received in a complementary manner in notches delimited by the inner face of the tubular wall 12.

The control member 40 also includes a screw 44 which is screwed, about the axis X-X, into the nut 42, while being locked in translation according to the axis X-X relative to the casing 10, and this by any appropriate, non-limiting means of the invention. Thus, in the assembled state of the device 1, when the screw 44 is driven in rotation on itself about the axis X-X, the screw 44 drives the nut 42 in axial translation, and this downwards or upwards depending on the direction of rotation of the screw 44. The translation of the nut causes the corresponding translational drive of the end cap 41, and thus of the piston 36, relative to the casing 10. As is clearly visible in FIG. 1, the screw 44 protrudes at least partially from the casing 10, extending along the X-X axis from the inside to the outside of the casing 10. The screw 44 thus includes an upper end portion, which is arranged outside the casing 10 and which is intended to be rotatably connected about the axis X-X to a handle, not shown in the figures. The screw 44 can thus be driven in rotation about the X-X axis, from outside the casing 10, by a user operating the aforementioned handle.

We will now describe in detail how the slide valve 20 and the body 33 of the thermostatic element 31 are mechanically connected to each other. As can be clearly seen in FIG. 1, a hub 20.1 of the slide valve 20 is mounted on the body 33, cooperating with an operating part 33.1 of this body 33, which extends along the axis X-X and which forms, at its opposite axial ends, an upper stop 33.2 and a lower stop 33.3. The hub 20.1 of the slide valve 20 is mounted so as to be freely movable according to the axis X-X on the operating part 33.1 of the body 33, between the upper stop 33.2 and the lower stop 33.3. The operating part 33.1 is for example received in a central bore of the hub 20.1 in a freely sliding manner according to a sliding connection or a sliding pivot connection. Furthermore, the axial distance between the upper 33.2 and lower 33.3 stops is intended to be larger than the axial dimension of the hub 20.1. The respective embodiments of the upper stop 33.2 and the lower stop 33.3 are not limiting to the invention: in the example embodiment considered here, the upper stop 33.2 is formed by a stop part 37, such as a circlip, a nut, etc., fixedly attached to the body 33, while the lower stop 33.3 is formed by a shoulder 38 integrated into a stepped structure of the body 33. Whatever the forms of construction of the slide valve 20 and the body 33, their relative arrangement is provided so that, in the assembled state of the device 1, the slide valve 20 presses axially against the upper stop 33.2 when the temperature of the water W in the chamber 11 is higher than a first predetermined temperature, called temperature T1 hereafter, and the slide valve 20 presses axially against the lower stop 33.3 when the temperature of the water W in the chamber 11 is lower than a second predetermined temperature, which is referred to as temperature T2 hereafter and which is lower than temperature T1, typically by several degrees, in particular at least 4° C. When the temperature of the water W in the chamber 11 is between the temperatures T1 and T2, the slide valve 20 is freely movable along the axis X-X relative to the body 33, between the upper stop 33.2 and the lower stop 33.3, in other words along the operating part 33.1 of the body 33. In other words, when the temperature of the water W in the chamber 11 is either higher than the temperature T1 or lower than the temperature T2, the slide valve 20 and the body 11 are connected in displacement along the axis X-X with each other, due to the cooperation in axial support between the slide valve 20 and the upper 33.2 and lower 33.3 stops, whereas, when the temperature of the water W in the chamber 11 is between the temperatures T1 and T2, the slide valve 20 and the body 33 are decoupled from each other along the axis X-X, by free relative movement in an axial clearance J which is formed between the slide valve and the body, the axial extent of this clearance J being equal to the difference between the axial spacing between the upper stops 33.2 and lower stops 33.3 and the axial dimension of the hub 20.1.

Other features of the device 1 will appear hereafter in the context of the description of the operation of this device, illustrated in different states by FIGS. 1 to 6 respectively.

In FIG. 1, the temperature of the water W admitted into the chamber 11 through the inlet passage 3 and the inlet 14 is higher than the temperature T1. The slide valve 20 is connected in displacement according to the X-X axis with the body 33 of the thermostatic element 31, due to the axial pressure of the slide valve against the upper stop 33.2, as detailed above, while, at the same time, the piston 36 of the thermostatic element is so deployed relative to the body 33 that, on the one hand, the body 33 presses the slide valve 20 axially against the seat 16, which is equivalent to saying that the slide valve is held firmly in the closed position, and, on the other hand, the piston 36 presses the end cap 41 axially against the overtravel spring 43, deforming the latter so as to accommodate the overtravel of the piston.

Figure 2:
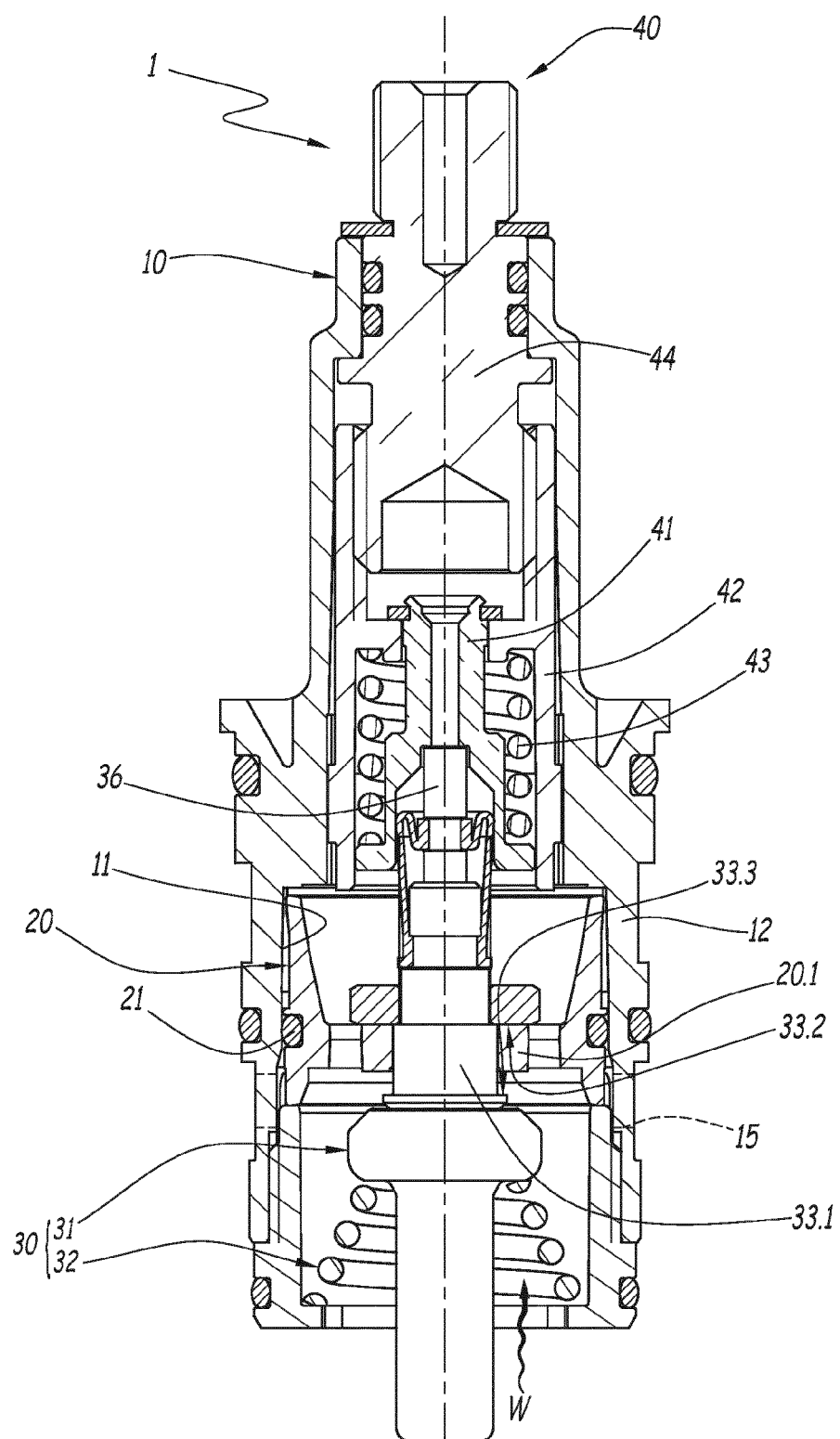
FIGS. 2 to 6 are views similar to FIG. 1, respectively illustrating successive operating states of the control device of FIG. 1.

The device 1 changes from the operating state of FIG. 1 to that of FIG. 2 when the water temperature W falls until it is equal to the temperature T1. Compared to the operating state of FIG. 1, in the operating state of FIG. 2 the slide valve 20 occupies the same axial position relative to the casing 10, in other words the slide valve 20 remains in the closed position, as well as the same position relative to the body 33 of the thermostatic element 31, in other words, the hub 20.1 of the slide valve 20 remains in contact with the upper stop 33.2 of the body 33. On the other hand, compared to the operating state of FIG. 1, the piston 33 of the thermostatic element 31 is, in the operating state of FIG. 2, less deployed relative to the body 33, so that the overtravel spring 43 is no longer deformed and connects the end cap 41 and the nut 42 axially in a rigid manner, thus fixing the axial position of the piston 36 relative to the casing 10.

The device 1 changes from the operating state of FIG. 2 to that of FIG. 3 as the water temperature W continues to fall, from temperature T1 to a temperature between temperatures T1 and T2. The piston 36 of the thermostatic element 31 retracts relative to the body 33, which causes the body 33 to move upwards according to the axis X-X, under the effect of the return spring 32. The upper stop 33.2 of the body 33 then moves axially away from the hub 20.1 of the slide valve 20, as clearly visible in FIG. 3. The slide valve 20 remains in a fixed position along the axis X-X relative to the casing 10, due, on the one hand, to the free axial movement between the hub 20.1 of the slide valve 20 and the operating part 33.1 of the body 33 and, on the other hand, to the absence of axial forces applied to the slide valve 20, particularly by the body 33. In practice, friction between the outer face of the slide valve 20 and the inner face of the tubular wall 12 contributes to immobilizing the slide valve 20 axially: in the example of the embodiment considered in the figures, this friction is generated in particular by a seal 21 which is interposed radially between the outer face of the slide valve 20 and the inner face of the tubular wall 12. In any case, as is clearly visible by comparison between FIGS. 2 and 3, the slide valve 20 remains in the closed position.

The device 1 passes from the operating state of FIG. 3 to that of FIG. 4 when the water temperature W falls further, until it is equal to the temperature T2. In this operating state of FIG. 4, the piston 36 has retracted further relative to the body 33 while this latter has been moved axially upwards until the lower stop 33.3 comes into axial contact with the hub 20.1 of the slide valve 20. Compared to the operating state of FIG. 3, the slide valve 20 remains in the closed position in the operating configuration of FIG. 4, for the same reasons as discussed above in connection with FIG. 3. The piston 36 retracts further from the body 3.

The device 1 passes from the operating state of FIG. 4 to that of FIG. 5 when the water temperature W continues to fall further, falling below the temperature T2. Compared to the operating state of FIG. 4, in the operating configuration of FIG. 5, the piston 36 is retracted even further relative to the body 33 and the body 33 is moved even higher by the return spring 32. In contrast to the development between FIGS. 2 and 4, the upward axial displacement of the body 33 between the operating state of FIG. 4 and the operating state of FIG. 5 correspondingly results in the upward axial displacement of the slide valve 20, due to the axial pressure of the hub 20.1 of this slide valve against the lower stop 33.3 of the body 33. Thus, as can be seen in FIG. 5, the slide valve moves into the open position. The water W present in the chamber 11 can then leave this chamber through the outlet 15 and flow into the outlet passage 4.

The device 1 passes from the operating state of FIG. 5 to that of FIG. 6 when the temperature of the water W admitted into the chamber 11 rises, passing again above the temperature T2 until reaching a temperature between the temperatures T1 and T2. Compared to the operating state in FIG. 5, the piston 36 moves relative to the body 33, which pushes the body 33 down relative to the casing 10, by compressing the return spring 32. The lower stop 33.3 of the body 33 moves axially away from the hub 20.1 of the slide valve 20, due, on the one hand, to the downward drive of the body 33 and, on the other hand, to the holding in position, according to the axis X-X, of the slide valve 20 relative to the casing 10, this holding in position resulting from the absence of axial forces applied to the slide valve 20, particularly by the body 33. Here again, the holding in position of the slide valve 20 relative to the casing 10 is advantageously reinforced by the friction at the interface between the outer face of the slide valve 20 and the inner face of the tubular wall 12, particularly at the level of the seal 21. In all cases, the slide valve 20 thus remains in the open position, as clearly visible in FIG. 6.

The device 1 passes from the operating state of FIG. 6 to that of FIG. 1 when the temperature of the water W in the chamber 11 continues to rise, until it passes above the temperature T1. Specifically, when starting from the operating condition of FIG. 6, the temperature of the water W in chamber 11 rises until it reaches temperature T1, the piston 36 moves further relative to the body 33, by moving the body 33 downwardly relative to the casing 10 until the upper stop 33.2 of the body 33 is brought into axial contact with the hub 20.1 of the slide valve 20. When the temperature of the water W in the chamber 11 rises above the temperature T1, the downward displacement of the body 33 is transmitted to the slide valve 20 due to the axial pressure of the hub 20.1 of the slide valve against the upper stop 33.2 of the body 33. The slide valve 20 then moves from the open position to the closed position. If necessary, if the water temperature W continues to rise while the slide valve 20 is in the closed position, the device 1 passes from the operating state of FIG. 2 to the operating state of FIG. 1.

Thus, the thermostatic element 31 and the return spring 32 allow the slide valve 20 to be driven between the closed and open positions as a function of the temperature of the water W in the chamber 11, without, however, the slide valve moving from one to the other of these closed and open positions for the same temperature of this water W due to the arrangements of the slide valve 20 and the body 33 of the thermostatic element 31, which relate to the hub 20.1 and the operating part 33.1. These arrangements relating to the hub 20.1 of the slide valve 20 and to the operating part 33.1 of the body 33 thus correspond to hysteretic arrangements, which, while being integrated into the slide valve 20 and the body 33, bring hysteresis to the operation of the device 1, in the sense that, on the one hand, the slide valve 20 is driven by the thermomechanical actuator 30 to pass from the open position to the closed position when the temperature of the water W in the chamber 11 rises until it passes above the temperature T1 and, on the other hand, the slide valve 20 is driven by the thermomechanical actuator 30 to move from the closed position to the open position when the temperature of the water W in the chamber 11 falls below the temperature T2. Therefore, the device 1 can be used in a hot water circuit in order to replace the existing devices, which are described in the introductory part of the present document and which allow, at the level of a draw-off point, that the water leaving this draw-off point is "always hot", such that it is almost immediately at a temperature always higher than the temperature T2. In this context, the temperature T1 and the temperature T2 can be respectively 40° C. and 32° C.

Taking into account the above explanations, it is understood that the difference between the temperatures T1 and T2 is defined by the axial clearance J defined between the slide valve 20 and the body 33, related to the expansion curve of the thermostatic element 31. Consequently, the difference between the temperatures T1 and T2 can be easily fixed during the design of the device 1, by playing on the extent of the axial clearance J and/or on the characteristics of the expansion curve of the thermostatic element 31.

Furthermore, the value of the temperatures T1 and T2 is directly related to the position of the piston 36 along the axis X-X relative to the casing 10, in the sense that, independently of the temperature of the water W in the chamber 11, the axial position of the slide valve 20 relative to the seat 16 is modified by changing the axial position of the piston relative to the casing. Since the axial position of the piston 36 along the axis X-X relative to the casing 10 is controlled by the control member 40 as explained above, it is understood that this control member 40 allows, in the assembled state of the device 1, to adjust the value of the temperatures T1 and T2. In practice, this adjustment can be performed by the user while the device 1 is in operation: in this case, the user moves the upper terminal portion of the screw 44, outside the casing 10, as explained above.

As an extension of the above considerations, it should be noted that the casing 10, the slide valve 20, the thermomechanical actuator 30 and the control member 40 are advantageously assembled together to form a cartridge which, as a single piece, can be fitted into the housing 2. This feature of the device 1 reinforces its practicality. Moreover, this cartridge of the device 1 is structurally similar to a thermostatic mixing cartridge, which is commonly used in thermostatic faucets, and which makes it possible to deliver mixed water by mixing cold water and hot water fed to this cartridge. However, the cartridge of the device 1 differs substantially from such a thermostatic mixing cartridge by the aforementioned hysteretic arrangements, it being noted that such hysteresis-inducing arrangements are to be avoided for a thermostatic mixing cartridge since they would render the latter unusable for thermostatic regulation purposes.

Moreover, the direction of water circulation in the cartridge of the device 1 is, as it were, reversed relative to that in a thermostatic mixing cartridge: in fact, on the one hand, the water W enters the chamber 11 of the cartridge of the device 1 through what corresponds to the mixed water outlet for the thermostatic mixing cartridge and, on the other hand, the water W leaves the chamber 11 through what corresponds to the hot water inlet for the thermostatic mixing cartridge. In any case, part of the cartridge of the device 1 can advantageously be manufactured from the components of a thermostatic mixing cartridge, which reduces its design and manufacturing cost. Moreover, it should be noted that if the casing 10 of the device 1 is a component from a thermostatic mixing cartridge, then the casing 10 necessarily includes a cold water inlet, which is of no interest for the cartridge of the device 1 and which must be permanently sealed within the device 1 to avoid leakage of the water W when the slide valve 20 is in the closed position, this sealing being able to be carried out in particular by the housing 2.

Figure 7:
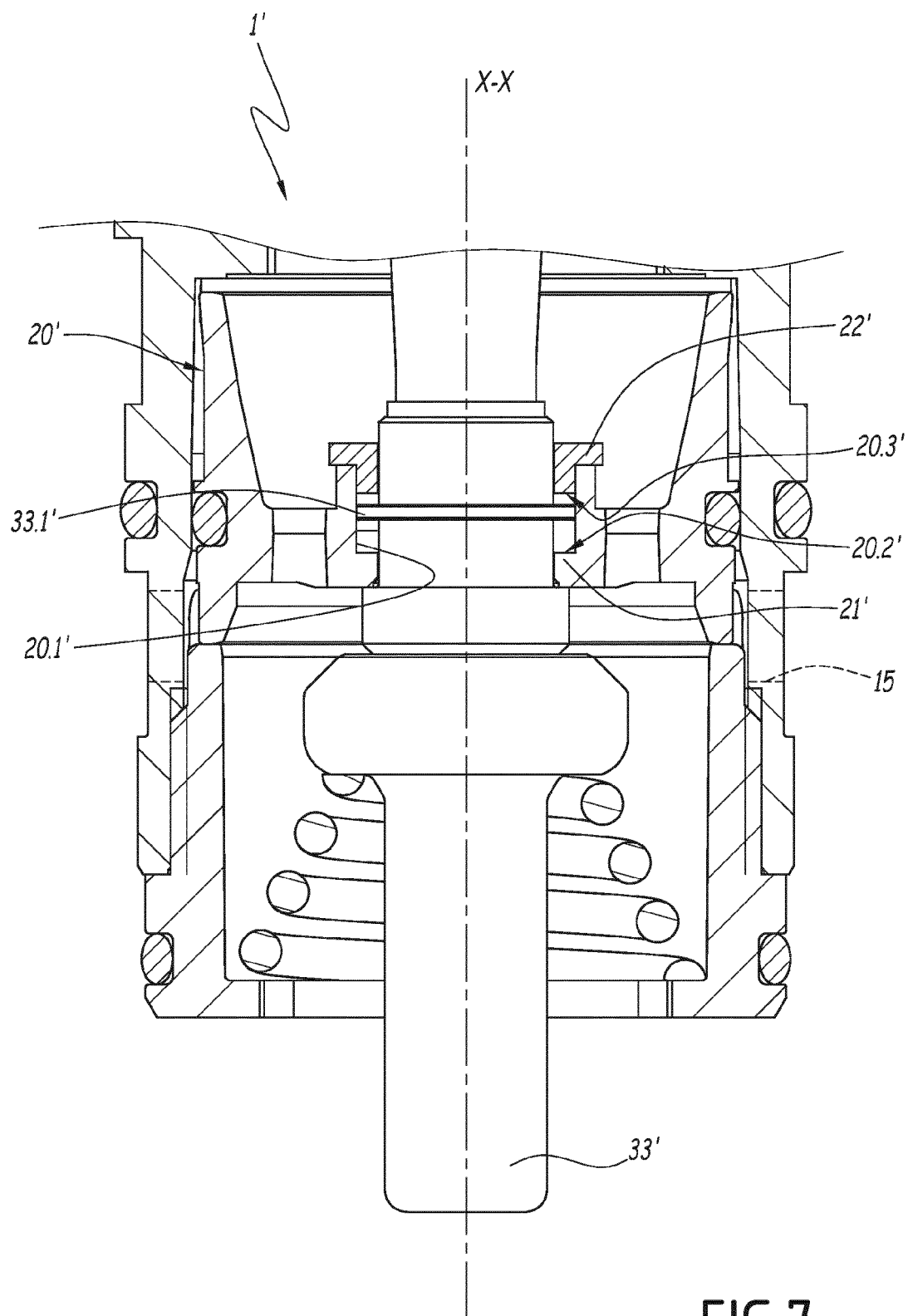
FIG. 7 is a view similar to FIG. 1, showing, on a larger scale, a variant of a portion of the device of FIG. 1.

FIG. 7 shows one variant of the device 1, which is referred to as 1' and in which the shape of the axial clearance between the slide valve and the body of the thermostatic element is reversed. More precisely, the device 1' is identical to the device 1, except that, on the one hand, the body of its thermostatic element, which is referenced 33', is devoid of the operating part 33.1 in favor of an external peripheral flange 33.1', and its slide valve, which is referenced 20', forms a housing 20.1' in which the flange 33.1' is received. At its opposite axial ends, the housing 20' is closed by a lower stop 20.2' and an upper stop 20.3'. The collar 33.1' comes to rest against the lower stop 20.2' when the temperature of the water W in the chamber 11 is higher than the temperature T1, whereas this collar comes to rest axially against the upper stop 20.3' when the temperature of this water is lower than the temperature T2. When the temperature of the water W in the chamber 11 is between the temperatures T1 and T2, the collar 33.1' and, consequently, the whole body 33' is freely movable according to the axis X-X relative to the slide valve 20' between the stops 20.2' and 20.3'. In the example considered in FIG. 7, the lower stop 20.2' is formed by a shoulder 21' of the hub of the slide valve 20' and the upper stop 20.3' is formed by a stop piece 22' fixedly attached to the hub of the slide valve 20'.

In all cases, the housing 20.1' and the collar 33.1' are, together, functionally similar to the operating part 33.1 and to the hub 20.1 of the device 1, while having an inverse structure, and thus correspond to hysteretic arrangements, which are integrated into the slide valve 20' and the body 33' and which give the device 1' the same operation as the device 1.

The hysteresis-inducing arrangements of the device 1, which have been detailed above, and the hysteresis-inducing arrangements of the device 1', which have just been described, illustrate the multitude of manufacturing methods that can be taken by mechanical connecting elements, which, on the one hand, connect the slide valve 20 or 20' and the body 33 or 33' to each other in displacement according to the X-X axis when the temperature of the water W in the chamber 11 is higher than the temperature T1 and when this temperature is lower than the temperature T2, and which, on the other hand, create between the slide valve 20 or 20' and the body 33 or 33' an axial play which decouples the slide valve and the body according to the X-X axis when the temperature of the water W in the chamber 11 is between the temperatures T1 and T2.

Figure 8:
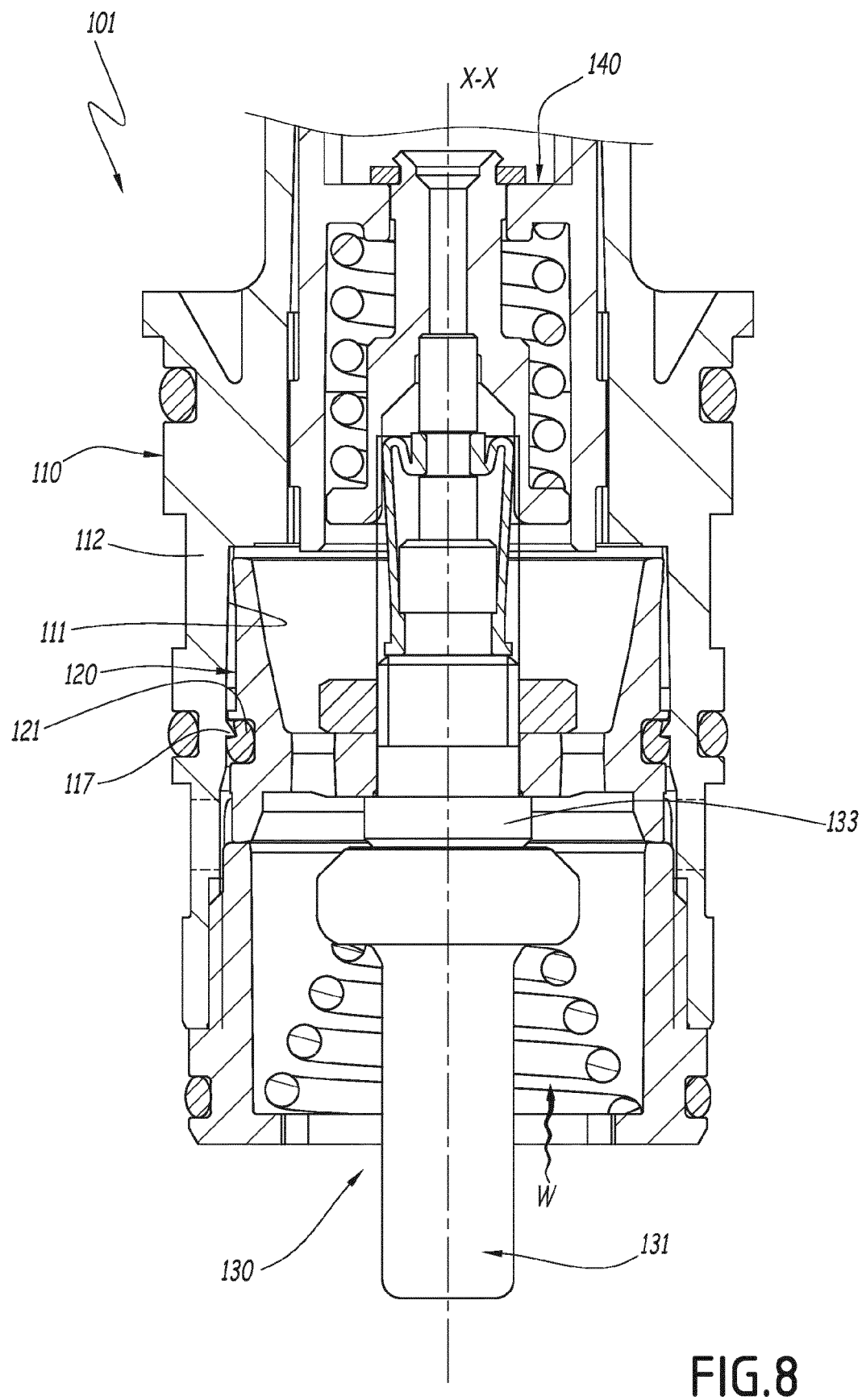
FIG. 8 is a view similar to FIG. 1, illustrating a second embodiment of a control device.
Figure 9:
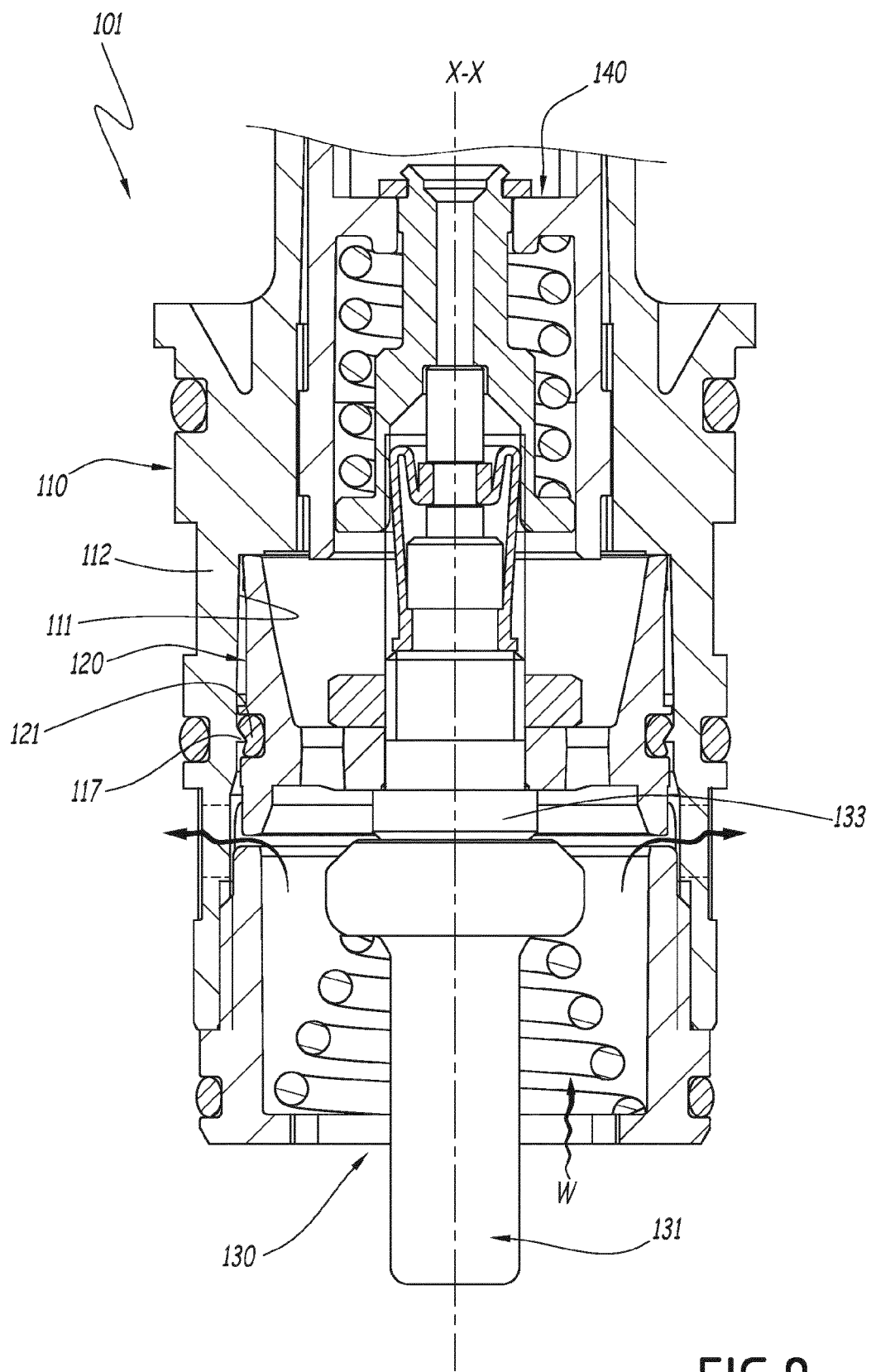
FIG. 9 is a view similar to FIG. 1, illustrating the control device of FIG. 8 in a different operating state than that illustrated in FIG. 8.

FIGS. 8 and 9 show one alternative embodiment of the device 1, in the form of a device 101. The device 101 allows, like the device 1, to control a flow of the fluid and to be attached in the housing 2 to control the circulation of the water W, through the device 101, from the inlet passage 3 to the outlet passage 4.

The device 101 includes a casing 110, a slide valve 120, a thermomechanical actuator 130 and a control member 140, which are respectively identical to the casing 10, the slide valve 20, the thermomechanical actuator 30 and the control member 40 of the device 1, except for the differences detailed below.

On the one hand, the slide valve 120 and the body 133 of the thermostatic element 131 of the thermomechanical actuator 130 are fixedly attached to each other. In other words, unlike the device 1, the slide valve 120 and the body 133 of the thermostatic element 131 of the device 101 are devoid of mechanical connecting elements that induce hysteresis.

On the other hand, the casing 110 is provided, on the inner face of its tubular wall 112, with a rigid relief 117 designed to interfere, according to the X-X axis, with a seal 121 of the slide valve 120. The seal 121 is carried by the outer face of the slide valve 120 and is here provided to seal the interface between this outer face of the slide valve and the inner face of the tubular wall 112 of the casing 110. In the embodiment considered in FIGS. 8 and 9, the relief 117 is made in the form of a protruding tooth, which runs along all or part of the inner periphery of the tubular wall 112 and which interferes axially with the seal 121 by penetrating transversely into the latter and, thereby, deforming the seal 121 by crushing. Rather than being a protruding relief, the relief 117 may, as an alternative not shown, be a recessed relief, such as a groove, which runs along all or part of the inner periphery of the transverse wall 112 and which interferes axially with the seal 121 by allowing itself to be penetrated transversely by a portion of the seal and, thereby, by retaining this seal by trapping. Regardless of the design of the relief 117 of the casing 110, the axial interference between this relief and the seal 121 of the slide valve 120 generates, by mechanical friction, a resistance which opposes the displacement of the slide valve according to the axis X-X relative to the casing. In the assembled state of the device 101, the casing 110 and the slide valve 120 are thus provided, by the dimensioning of the relief 117 and the seal 121, to generate, by mechanical friction between them, a resistance such that: when the temperature of the water W in the chamber 111 of the casing 110 is between the temperatures T1 and T2, the aforementioned resistance opposes the thermomechanical actuator 130 from moving the slide valve 120 according to the axis X-X relative to the casing 110, when the temperature of the water W in the chamber 111 rises above the temperature T1, the aforementioned resistance is overcome by the force applied to the slide valve 120 by the thermomechanical actuator 130 to drive the slide valve towards its closed position, illustrated in FIG. 8, and when the temperature of the water W in the chamber 11 falls below the temperature T2, the aforementioned resistance is overcome by the force which is applied to the slide valve 120 by the thermomechanical actuator 130 to drive the slide valve towards its open position, illustrated in FIG. 9.

Thus, it is understood that the device 101 comprises hysteretic arrangements, which have the same purpose as those described for the device 1, but which are integrated into the casing 110 and the slide valve 120 and which consist of mechanical friction elements, such as the relief 117 and the seal 121, capable of generating, by axial interference, the aforementioned resistance.

In practice, by playing on the shape and size of these mechanical friction elements when designing the device 101, it is advantageous to fix the difference between the temperatures T1 and T2. Thus, in the example of FIGS. 8 and 9, the tooth formed by the relief 117 may have upper and lower slopes that are different from each other, so that the value of the resistance generated by friction is less in one axial direction than in the opposite axial direction.

With respect to the value of the temperatures T1 and T2, it is adjustable, in use, by means of the control member 140, taking into account the considerations similar to those set forth for the control member 40 of the device 1.

As one unshown variant of the device 101, the part of the slide valve 120, which interferes axially with the relief 117 of the casing 110, may be formed by a flexible element distinct from the seal 121, such as, more generally, a flexible element which does not provide a sealing function.

Furthermore, also as one unshown variant of the device 101, the structure of the mechanical friction elements may be reversed, in the sense that, rather than the rigid relief of these mechanical friction elements being provided on the casing 110 and the flexible portion of these mechanical friction elements being provided on the slide valve 120, as in the example of FIGS. 8 and 9, the rigid relief may be provided on the slide valve while the flexible portion may be provided on the casing.

In any case, the mechanical friction elements just described in connection with FIGS. 8 and 9, such as the relief 117 and the seal 121, can advantageously be combined with the hysteresis-inducing arrangements of the embodiment of FIGS. 1 to 7, thereby providing additional hysteresis thereto.

Various options and variants of the devices 1, 1' and 101 are also conceivable: in order to reinforce the seal of the axial support between the slide valve 20, 20' or 120 and the casing 10 or 110 when the slide valve is in the closed position, the seat 16 can be made of a flexible material, such as an elastomer coating; and/or the various embodiments described thus far may be at least partially combined with each other to provide new embodiments.

The invention claimed is:

1. A device for flow controlling a fluid, including:
   a casing, which defines an axis and which delimits a chamber in which the fluid flows between an inlet and an outlet of the casing,
   a slide valve which is mobile in the chamber along the axis between:
      a closed position, in which the slide valve is pressed axially against a fixed seat of the casing so as to prevent the fluid, admitted into the chamber through the inlet, from leaving the chamber through the outlet, and
      an open position, in which the slide valve is axially separated from the seat so as to let the fluid, admitted into the chamber through the inlet, leave the chamber through the outlet,
   a thermomechanical actuator, which is designed to drive the slide valve between the closed and open positions depending on a temperature of the fluid in the chamber and which includes:
      a thermostatic element, which includes both a piston, which is connected to the casing in such a way that, in an operating configuration of the device, the piston occupies a fixed position according to the axis relative to the casing, and a body, which contains a thermally expandable material and which, together with this thermally expandable material, forms a heat-sensitive part of the thermomechanical actuator arranged in the chamber, the piston being mounted so as to be movable in the direction of the axis on the body in such a way that the piston is deployed relative to the body when the thermally expandable material expands, and
      a return spring, which is axially interposed between the casing and the body so as to retract the piston relative to the body upon contraction of the thermally expandable material, and
   hysteresis-inducing arrangements which define a first temperature, as well as a second temperature which is lower than the first temperature, the hysteresis-inducing arrangements being designed so that:
   the thermomechanical actuator drives the slide valve from the open position to the closed position when the temperature of the fluid in the chamber rises above the first temperature, and
   the thermomechanical actuator drives the slide valve from the closed position to the open position when the temperature of the fluid in the chamber falls below the second temperature,
   and wherein the hysteresis-inducing arrangements are integrated with the slide valve and the thermomechanical actuator and comprise mechanical connecting elements that are adapted to:
   connect the slide valve and the body to each other for displacement according to the axis when the temperature of the fluid in the chamber is higher than the first temperature and when the temperature of the fluid in the chamber is lower than the second temperature, and
   provide an axial clearance between the slide valve and the body, which decouples the slide valve and the body according to the axis when the temperature of the fluid in the chamber is between the first temperature and the second temperature.

2. The device according to claim 1, wherein the device further includes a control member able to adjust value of the first and second temperatures by changing the position of at least a part of the thermomechanical actuator along the axis relative to the casing.

3. The device according to claim 2, wherein the casing, the slide valve, the thermomechanical actuator, and the control member together form a cartridge that is able to be integrally fitted into a fluid system connection housing.

4. The device according to claim 2, wherein the control member comprises:
   an end cap, against which the piston is pressed axially under action of the return spring,
   a nut, on which the end cap is mounted in a sliding manner along the axis, and which is mounted on the casing both translationally movable along the axis and rotationally fixed about the axis,
   an overtravel spring, which is interposed axially between the end cap and the nut so as both to connect the end cap and the nut axially in a rigid manner as long as the movement of the slide valve by the body relative to the casing is free and to deform under effect of deployment of the piston relative to the body when movement of the slide valve by the body with respect to the casing is prevented, and
   a screw, which protrudes at least partially from the casing and which is screwed about the axis in the nut, while being locked in translation according to the axis relative to the casing.

5. The device according to claim 1,
   wherein the mechanical connecting elements include a first stop and a second stop, which are arranged on a first component of the slide valve and the body, and which are axially distant from each other, and wherein the second component of the slide valve and the body, is:

in axial abutment against the first stop when the temperature of the fluid in the chamber is higher than the first temperature, in axial abutment against the second stop when the temperature of the fluid in the chamber is lower than the second temperature, and freely movable according to the axis, relative to said first component, between the first and second stops when the temperature of the fluid in the chamber is between the first temperature and the second temperature.

6. The device according to claim 1, wherein the hysteresis-inducing arrangements are also integrated with the casing and further comprise mechanical friction elements, which are able to generate, by friction between the slide valve and the casing, a resistance that:

opposes the thermomechanical actuator from driving the slide valve according to the axis relative to the casing when the temperature of the fluid in the chamber is between the first temperature and the second temperature, is overcome by the force applied to the slide valve by the thermomechanical actuator to drive the slide valve towards the closed position when the temperature of the fluid in the chamber rises above the first temperature, and is overcome by the force applied to the slide valve by the thermomechanical actuator to drive the slide valve to the open position when the temperature of the fluid in the chamber falls below the second temperature.

7. The device according to claim 6, wherein the mechanical friction elements comprise a rigid relief, which is provided on a first component from the casing or the slide valve and which interferes axially with a flexible portion of the second component of the casing and the slide valve to generate said resistance.

8. The device according to claim 7, wherein said flexible portion is a seal.

9. The device according to claim 7, wherein said flexible portion is a seal of the slide valve.

10. The device according to claim 2, wherein the mechanical connecting elements include a first stop and a second stop, which are arranged on a first component of the slide valve and the body, and which are axially distant from each other, and wherein the second component of the slide valve and the body, is:

in axial abutment against the first stop when the temperature of the fluid in the chamber is higher than the first temperature, in axial abutment against the second stop when the temperature of the fluid in the chamber is lower than the second temperature, and freely movable according to the axis, relative to said first component, between the first and second stops when the temperature of the fluid in the chamber is between the first temperature and the second temperature.

11. The device according to claim 3, wherein the mechanical connecting elements include a first stop and a second stop, which are arranged on a first component of the slide valve and the body, and which are axially distant from each other, and wherein the second component of the slide valve and the body, is:

in axial abutment against the first stop when the temperature of the fluid in the chamber is higher than the first temperature, in axial abutment against the second stop when the temperature of the fluid in the chamber is lower than the second temperature, and freely movable according to the axis, relative to said first component, between the first and second stops when the temperature of the fluid in the chamber is between the first temperature and the second temperature.

12. The device according to claim 2, wherein the hysteresis-inducing arrangements are also integrated with the casing and further comprise mechanical friction elements, which are able to generate, by friction between the slide valve and the casing, a resistance that:

opposes the thermomechanical actuator from driving the slide valve according to the axis relative to the casing when the temperature of the fluid in the chamber is between the first temperature and the second temperature, is overcome by the force applied to the slide valve by the thermomechanical actuator to drive the slide valve towards the closed position when the temperature of the fluid in the chamber rises above the first temperature, and is overcome by the force applied to the slide valve by the thermomechanical actuator to drive the slide valve to the open position when the temperature of the fluid in the chamber falls below the second temperature.

13. The device according to claim 12, wherein the mechanical friction elements comprise a rigid relief, which is provided on a first component from the casing or the slide valve and which interferes axially with a flexible portion of the second component of the casing and the slide valve to generate said resistance.

14. The device according to claim 13, wherein said flexible portion is a seal.

15. The device according to claim 13, wherein said flexible portion is a seal of the slide valve.

16. The device according to claim 3, wherein the hysteresis-inducing arrangements are also integrated with the casing and further comprise mechanical friction elements, which are able to generate, by friction between the slide valve and the casing, a resistance that:

opposes the thermomechanical actuator from driving the slide valve according to the axis relative to the casing when the temperature of the fluid in the chamber is between the first temperature and the second temperature, is overcome by the force applied to the slide valve by the thermomechanical actuator to drive the slide valve towards the closed position when the temperature of the fluid in the chamber rises above the first temperature, and is overcome by the force applied to the slide valve by the thermomechanical actuator to drive the slide valve to the open position when the temperature of the fluid in the chamber falls below the second temperature.

17. The device according to claim 16, wherein the mechanical friction elements comprise a rigid relief, which is provided on a first component from the casing or the slide valve and which interferes axially with a flexible portion of the second component of the casing and the slide valve to generate said resistance.

18. The device according to claim 17, wherein said flexible portion is a seal.

19. The device according to claim 17, wherein said flexible portion is a seal of the slide valve.

20. The device according to claim 3, wherein the control member comprises:
- an end cap, against which the piston is pressed axially under action of the return spring,
- a nut, on which the end cap is mounted in a sliding manner along the axis, and which is mounted on the casing both translationally movable along the axis and rotationally fixed about the axis,
- an overtravel spring, which is interposed axially between the end cap and the nut so as both to connect the end cap and the nut axially in a rigid manner as long as the movement of the slide valve by the body relative to the casing is free and to deform under effect of deployment of the piston relative to the body when movement of the slide valve by the body with respect to the casing is prevented, and
- a screw, which protrudes at least partially from the casing and which is screwed about the axis in the nut, while being locked in translation according to the axis relative to the casing.

\* \* \* \* \*